United States Patent
Nandakumar et al.

(10) Patent No.: US 9,596,231 B1
(45) Date of Patent: Mar. 14, 2017

(54) GRID-BASED AUTHENTICATION ON TOUCH-AWARE DEVICES

(71) Applicant: CA, INC., New York, NY (US)

(72) Inventors: Vikrant Nandakumar, Hyderabad (IN); Naveen Harry Michael, Hyderabad (IN); Hemanth Pinninti, Hyderabad (IN); Vardhineedi Satyanarayana Murthy, Andhra Pradesh (IN)

(73) Assignee: CA, INC., New York, NY (US)

( * ) Notice: Subject to any disclaimer, the term of this patent is extended or adjusted under 35 U.S.C. 154(b) by 32 days.

(21) Appl. No.: 14/832,928

(22) Filed: Aug. 21, 2015

(51) Int. Cl.
*G06F 7/04* (2006.01)
*H04L 29/06* (2006.01)

(52) U.S. Cl.
CPC .......... *H04L 63/083* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 5,239,583 A | 8/1993 | Parrillo | |
| 6,246,769 B1 | 6/2001 | Kohut | |
| 7,240,367 B2 * | 7/2007 | Park | G06F 21/36 726/18 |
| 7,577,987 B2 * | 8/2009 | Mizrah | G06F 21/31 726/18 |
| 8,191,126 B2 | 5/2012 | Raghavan | |
| 9,165,132 B2 * | 10/2015 | Rhee | G06F 3/0346 |
| 2014/0053254 A1 | 2/2014 | Sun et al. | |
| 2014/0181758 A1 * | 6/2014 | Pasquero | G06F 3/04883 715/863 |
| 2015/0101041 A1 * | 4/2015 | Devar | G06F 21/36 726/19 |

OTHER PUBLICATIONS

U.S. Appl. No. 14/670,799, filed Mar. 27, 2015.

* cited by examiner

*Primary Examiner* — Dede Zecher
*Assistant Examiner* — Abdullah Almamun
(74) *Attorney, Agent, or Firm* — Vierra Magen Marcus LLP

(57) ABSTRACT

Systems and methods for generating secure passwords, personal identification numbers (PINs), and other user credentials using touch-aware devices are described. In some cases, an end user of a computing device may use a touch-sensitive interface (e.g., a touchscreen) to indirectly enter user credentials for accessing protected information or a protected computing resource using the computing device. The end user may indirectly enter the user credentials by entering information that is different from the actual user credentials. In one example, the touch-sensitive interface may display a plurality of numbers and paths connecting the plurality of numbers and the end user of the computing device may select a sequence of numbers of the plurality of numbers using a touch gesture. The computing device may generate a user credential different from the sequence of numbers using the sequence of numbers selected by the end user.

18 Claims, 8 Drawing Sheets

GRID-BASED AUTHENTICATION ON TOUCH-AWARE DEVICES

BACKGROUND

The present disclosure relates to systems and methods for enabling secure user authentication.

Credentials may be used to gain access to information and/or computing resources (e.g., servers, storage devices, files, and computing applications). In one example, an end user of a mobile device (e.g., a tablet computer or smartphone) may provide user credentials, such as a user identifier and password, in order to gain access to native applications, web-based applications, or cloud-based applications accessible using the mobile device. In another example, user credentials may be used to access an online bank account or to facilitate an online transaction to purchase goods or services using the Internet. The user credentials may include a personal identification number (PIN) or PIN code. A PIN may comprise a static PIN that does not change over time or a dynamic PIN that changes over time (e.g., a new PIN may be used for every transaction). In some cases, multi-factor authentication may be used in which more than one credential is required in order to gain access to applications running on the mobile device. For example, two-factor authentication may require the end user of the mobile device to provide two authentication factors before gaining access to the applications running on the mobile device. An authentication factor may comprise a knowledge factor (e.g., something the end user has knowledge of such as a password), a possession factor (e.g., something the end user has possession of such as a smart card or security token), or an inherence factor (e.g., something inherent only to the end user such as a biometric characteristic). Biometric characteristics may comprise distinguishing characteristics of the end user such as a fingerprint, a voice characteristic, or a facial characteristic.

BRIEF SUMMARY

According to aspects of the present disclosure, technology for enabling secure user authentication is disclosed.

Technology is described for generating secure passwords, personal identification numbers (PINs), and other user credentials using touch-aware devices (e.g., a mobile device with a touchscreen or an ATM with a touchscreen interface). In some cases, an end user of a computing device may use a touch-sensitive interface (e.g., a touchscreen) to indirectly enter user credentials for accessing protected information (e.g., files or applications) using the computing device. The end user may indirectly enter the user credentials by entering information that is different from the actual user credentials. The touch-sensitive interface may display a plurality of numbers and paths connecting the plurality of numbers. In one example, the plurality of numbers may comprise ten numbers (e.g., the numbers 1 through 10 or 0 through 9) and the paths connecting the plurality of numbers may correspond with a star grid. The end user of the computing device may select a sequence of numbers of the plurality of numbers using a swiping gesture (e.g., the sequence of numbers may comprise a first number and a second number corresponding with a swiping gesture performed by the end user in which the swiping gesture starts from the first number and ends at the second number). The computing device may generate a user credential different from the sequence of numbers using the sequence of numbers selected by the end user. The user credential may comprise numbers that are different from the numbers within the sequence of numbers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
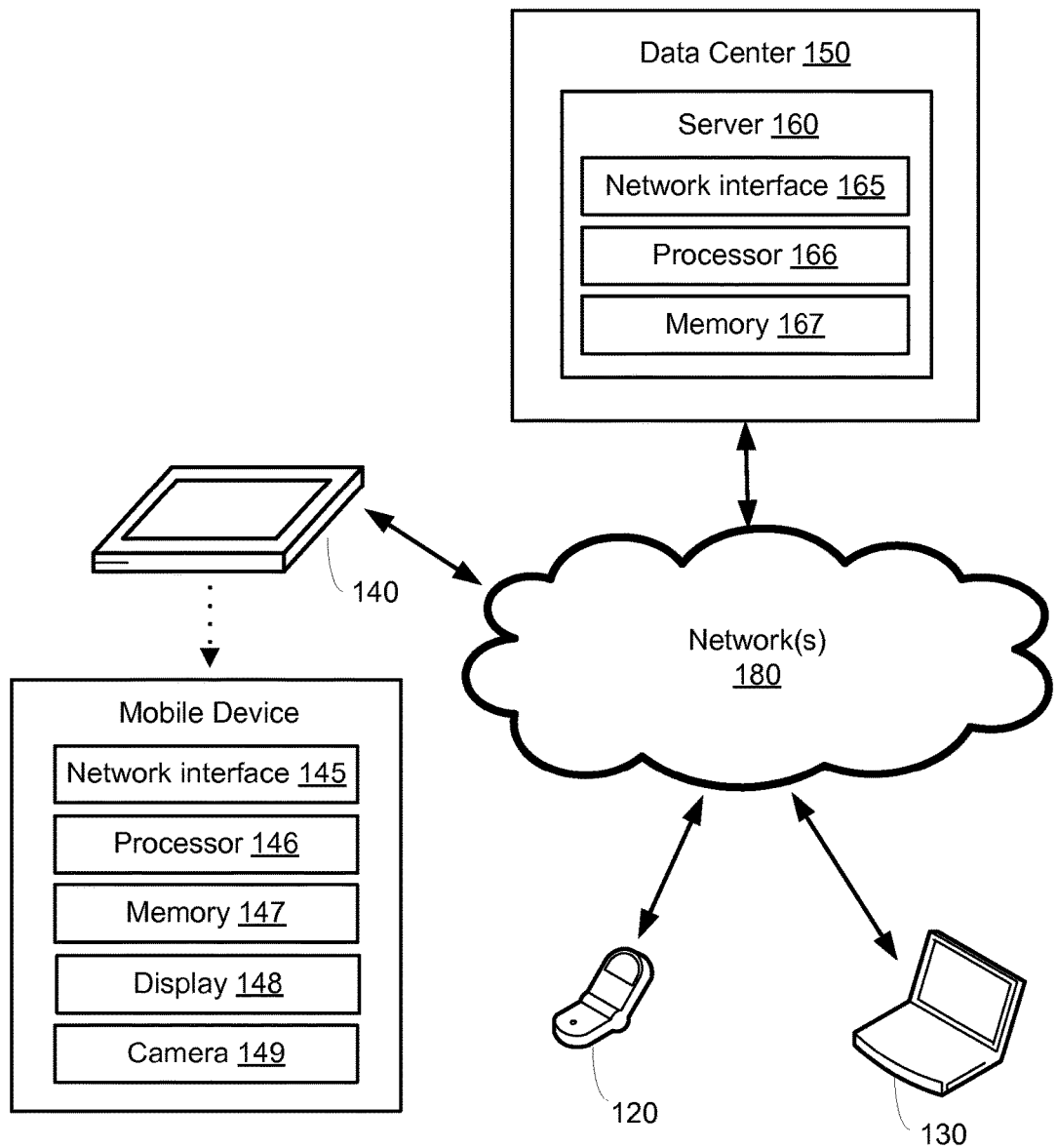
FIG. 1 is a block diagram of one embodiment of a networked computing environment.

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for generating secure passwords, personal identification numbers (PINs), and other user credentials using touch-aware devices (e.g., a mobile device with a touchscreen or a kiosk with a touchscreen interface). In some cases, an end user of a computing device may use a touch-sensitive interface (e.g., a touchscreen) to indirectly enter user credentials for accessing protected information (e.g., files or applications) using the computing device. The end user may indirectly enter the user credentials by entering information that is different from the actual user credentials. The computing device may comprise a mobile computing device, such as a smartphone or a tablet computer, or a non-mobile computing device. The touch-sensitive interface may display a plurality of numbers and paths connecting the plurality of numbers. In one example, the plurality of numbers may comprise ten randomly placed numbers (e.g., the numbers 1 through 10 or 0 through 9) and the paths connecting the plurality of numbers may correspond with a star grid. The end user of the computing device may select or otherwise identify a sequence of numbers of the plurality of numbers using a touch gesture (e.g., the sequence of numbers may comprise a first number, a second number, and a third number corresponding with a swiping gesture performed by the end user in which the swiping gesture starts from the first number and ends at the third number). The computing device may generate or compute a user credential different from the sequence of numbers using the sequence of numbers selected by the end user. In one example, the user credential may include a first digit that comprises the sum of a first number, a second number, and a third number of the sequence of numbers. In another example, the user credential may include a first digit that comprises the difference between a first number and a second number of the sequence of numbers. The user credential may comprise numbers that are different from any of the numbers within the sequence of numbers.

In some cases, the end user of the computing device may select one or more pairs of numbers from the plurality of numbers using the touch-sensitive interface. In one embodiment, the computing device may generate a user credential (e.g., a PIN code) using the one or more pairs of numbers selected by the end user and transmit the user credential to a server (e.g., an authentication server) in order to acquire protected files or other information from the server. The user credential may be generated based on computations performed using each pair of the one or more pairs of numbers. The user credential may be generated by performing various arithmetic operations (e.g., addition, subtraction, multiplication, or division) on each pair of the one or more pairs of numbers. In one example, a first pair of the one or more pairs of numbers may comprise a starting number (e.g., the first number selected during a swipe gesture performed by the end user) and an ending number (e.g., the last number selected during the swipe gesture performed by the end user). In some cases, a portion of the user credential corresponding with the first pair may comprise the difference between the starting number and the ending number (i.e., the starting number minus the ending number) if the starting number is greater than or equal to the ending number or may comprise the sum of the starting number and the ending number (i.e., the starting number plus the ending number) if the starting number is less than the ending number.

In one embodiment, a touch-sensitive interface may display a plurality of numbers arranged in a star grid in a random order. An end user of the touch-sensitive interface may perform a swiping gesture wherein the swiping gesture first selects a first number of the plurality of numbers (e.g., corresponding with where an end user of the touch-sensitive interface first touches the touch-sensitive interface) and traverses along the intersecting lines of the star grid and then ends at a second number of the plurality of numbers (e.g., corresponding with where the end user of the touch-sensitive interface last touches the touch-sensitive interface or removes their finger from the touch-sensitive interface). If the numerical value of the first number is less than the numerical value of the second number, then the first number and the second number may be added to provide a digit of a PIN code. However, if the numerical value of the first number is greater than or equal to the numerical value of the second number, then the second number may be subtracted from the first number to provide a digit of the PIN code.

In another embodiment, a computing device may transmit the one or more pairs of numbers selected by the end user directly to a server for authentication without generating the corresponding user credential. The one or more pairs of numbers may be encrypted prior to being transmitted to the server. In this case, the server may generate the user credential based on computations performed using each pair of the one or more pairs of numbers. In one example, a portion of the user credential may be generated using a first pair of the one or more pairs of numbers such that the portion of the user credential comprises a resulting computation performed using the first pair of numbers (e.g., either summing the first pair of numbers or determining a difference between the first pair of numbers).

In one embodiment, a speed of a swiping gesture performed by an end user of a touch-sensitive interface may be used to determine an arithmetic operation performed on a pair of numbers selected by the end user during the swiping gesture. In one example, if the speed of the swiping gesture is below a threshold speed, then the arithmetic operation may comprise an addition operation. In another example, if the speed of the swiping gesture is above a threshold speed, then the arithmetic operation may comprise a subtraction operation. In some embodiments, the arithmetic operation performed on a pair of numbers may depend on the speed of the swiping gesture and the numerical values of the pair of numbers. For example, the arithmetic operation may comprise a subtraction operation if a starting number of the pair of numbers is greater than the ending number of the pair of numbers and the speed of the swiping gesture is above a threshold speed.

One issue with entering user passwords and PIN codes using a touchscreen interface is that the user passwords and PIN codes may be visually captured by others while being entered and may be subsequently misappropriated or used to gain unauthorized access to protected files and/or applications. One benefit of indirectly entering user credentials using a touchscreen interface is that the user passwords and PIN codes are not directly entered and may remain secure even if data entry using the touchscreen interface is compromised.

In some embodiments, an access control system may perform various functions for managing access to resources including authentication, authorization, and auditing. Authentication may refer to the process of verifying that credentials provided by a user or entity are valid or to the process of confirming the identity associated with a user or entity (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., log files) for preserving evidence related to access control events. In some cases, an access control system may manage access to a protected resource by requiring authentication information or authenticated credentials (e.g., a valid username and password) before granting access to the protected resource. For example, an access control system may allow a remote computing device (e.g., a mobile phone) to access a protected resource, such as a file, webpage, application, or cloud-based application, via a web browser if valid credentials are provided to the access control system.

FIG. 1 is a block diagram of one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile device 120, mobile device 130, mobile device 140, and server 160. The mobile device 140 may comprise a mobile phone, smart device (e.g., an electronic watch with a touchscreen interface), or tablet computer. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. The one or more networks 180 may include a cellular network, a mobile network, or a wireless network. Each network of the one or more networks 180 may include hubs, bridges, routers, switches, and wired transmission media such as a wired network or direct-wired connection.

One embodiment of mobile device 140 includes a network interface 145, processor 146, memory 147, display 148, and camera 149, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, Flash, etc.).

Memory 147 may comprise a hardware storage device. Display 148 may comprise a touch-screen display. The touch-screen display may provide a touchscreen interface for controlling the mobile device 140 or for accessing data using the mobile device 140. Camera 149 may include an image sensor for capturing images. Camera 149 may capture color images of an environment. The camera 149 may comprise an image capturing device for capturing one or more images of an environment or an object within the environment. The mobile device 140 may include outward facing cameras that capture images of the environment and/or inward facing cameras that capture images of the end user of the mobile device.

The data center 150 may include one or more servers, such as server 160, in communication with one or more storage devices. The servers and data storage devices within a data center may be in communication with each other via a networking fabric connecting servers data storage units within the data center to each other. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

Networked computing environment 100 may provide a cloud computing environment for one or more computing devices. Cloud computing may refer to Internet-based computing, wherein shared resources, software, and/or information are provided to one or more computing devices on-demand via the Internet (or other global network). In some embodiments, a server, such as server 160, may act as an authentication server for determining whether access to a resource (e.g., an application, a database, a file, a webpage, a computer program, a file system, a server, or a storage device) should be granted.

In some cases, an end user of a mobile device, such as mobile device 140, may select one or more pairs of numbers out of a plurality of numbers using a touch-sensitive interface displayed using display 148. A first pair of the one or more pairs of numbers may be selected using a first swiping gesture and a second pair of the one or more pairs of numbers may be selected using a second swiping gesture performed subsequent to the first swiping gesture. In response, the mobile device may generate a user credential (e.g., a PIN code) using the one or more pairs of numbers selected by the end user and transmit the user credential to a server, such as server 160, in order to acquire protected files or other information from the server. The user credential may be generated based on computations performed using each pair of the one or more pairs of numbers. The user credential may be generated by performing arithmetic operations (e.g., addition, subtraction, multiplication, or division) on each pair of the one or more pairs of numbers. In one example, a first pair of the one or more pairs of numbers may comprise a starting number (e.g., the first number selected during a swipe gesture performed by the end user) and an ending number (e.g., the last number selected during the swipe gesture performed by the end user). In some cases, a portion of the user credential corresponding with the first pair may comprise the difference between the starting number and the ending number if the starting number is greater than or equal to the ending number or may comprise the sum of the starting number and the ending number if the starting number is less than the ending number.

Figure 2A:
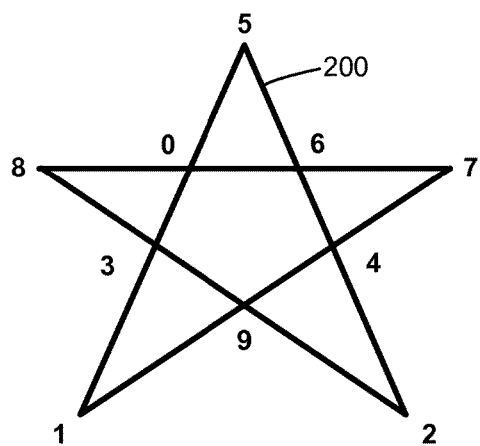
FIG. 2A depicts one embodiment of a star-shaped grid and a plurality of numbers.

FIG. 2A depicts one embodiment of a star grid 200 or a star-shaped grid and a plurality of numbers comprising the numbers 0 through 9 associated with various line intersection points of the star grid 200. As depicted, the paths connecting the line intersection points associated with the plurality of numbers may be traversed by an end user using a touch-sensitive interface.

Figure 2B:
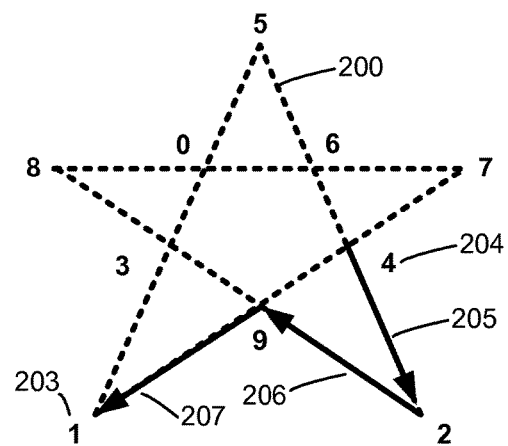
FIGS. 2B-2D depict various embodiments of the star-shaped grid depicted in FIG. 2A in which an end user of a touch-sensitive interface has performed a swiping gesture.

FIG. 2B depicts one embodiment of the star grid 200 depicted in FIG. 2A in which the end user of the touch-sensitive interface has performed a swiping gesture. The swiping gesture may comprise the end user touching the line intersection point associated with a starting number 204 (in this case, corresponding with the number 4) and traversing a path using their finger from the starting number 204 to the ending number 203 (in this case, corresponding with the number 1) and then lifting their finger up at or near the ending number 203. The path from the starting number 204 to the ending number 203 may comprise a first finger motion 205 from the number 4 to the number 2, a second finger motion 206 from the number 2 to the number 9, and a third finger motion 207 from the number 9 to the number 1. In one embodiment, the starting number 204 and the ending number 203 may comprise a pair of numbers and a portion of a PIN code or password may be generated by determining that the starting number 204 is greater than or equal to the ending number 203 and then generating the portion of the PIN code or password by subtracting the ending number 203 from the starting number 204. In this case, the portion of the PIN code or password may comprise the number 3.

Figure 2C:
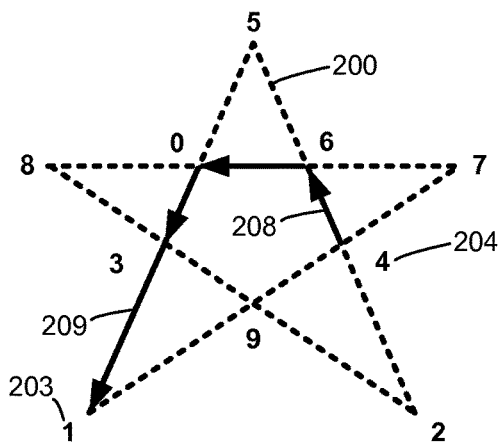

FIG. 2C depicts another embodiment of the star grid 200 depicted in FIG. 2A in which the end user of the touch-sensitive interface has performed a swiping gesture. The swiping gesture may comprise the end user touching the line intersection point associated with a starting number 204 (in this case, corresponding with the number 4) and traversing a path using their finger from the starting number 204 to the ending number 203 (in this case, corresponding with the number 1) and then lifting their finger up at or near the ending number 203. The path from the starting number 204 to the ending number 203 may comprise a first finger motion 208 from the number 4 to the number 6, a second finger motion from the number 6 to the number 0, a third finger motion from the number 0 to the number 3, and a fourth finger motion 209 from the number 3 to the number 1. In one embodiment, the starting number 204 and the ending number 203 may comprise a pair of numbers and a portion of a PIN code or password may be generated by determining that the starting number 204 is greater than or equal to the ending number 203 and then generating the portion of the PIN code or password by subtracting the ending number 203 from the starting number 204. In this case, the portion of the PIN code or password may comprise the number 3. Thus, two different paths may be traversed in order to generate the same portion of the PIN code or password.

In some cases, two or more different paths may be traversed in order to identify a pair of numbers used for generating a portion of a PIN code or password. A path from a starting number to an ending number may be identified by identifying the line segments comprising the path. A path from a starting number to an ending number may also be identified by identifying the corresponding numbers of the plurality of numbers associated with the line intersection points traversed during the swiping gesture. In some cases, the numbers corresponding with the plurality of numbers traversed during the swiping gesture may be transmitted to an authentication server, which may generate the portion of the PIN code or password remotely and perform authentication using the portion of the PIN code or password.

Figure 2D:
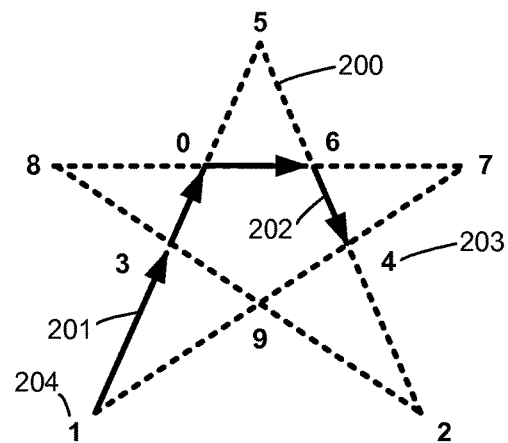

FIG. 2D depicts one embodiment of the star grid 200 depicted in FIG. 2A in which the end user of the touch-sensitive interface has performed a swiping gesture. The swiping gesture may comprise the end user touching the line intersection point associated with a starting number 204 (in this case, corresponding with the number 1) and traversing a path using their finger from the starting number 204 to the ending number 203 (in this case, corresponding with the number 4) and then lifting their finger up at or near the ending number 203. The path from the starting number 204 to the ending number 203 may comprise a first finger motion 201 from the number 1 to the number 3, a second finger motion from the number 3 to the number 0, a third finger motion from the number 0 to the number 6, and a fourth finger motion 202 from the number 6 to the number 4. In one embodiment, the starting number 204 and the ending number 203 may comprise a pair of numbers and a portion of a PIN code or password may be generated by determining that the starting number 204 is less than the ending number 203 and then generating the portion of the PIN code or password by adding the ending number 203 to the starting number 204. In this case, the portion of the PIN code or password may comprise the number 5.

Figure 2E:
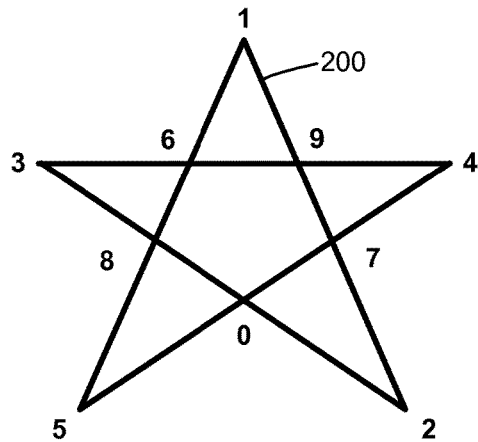
FIGS. 2E-2J depict various embodiments of user interfaces for indirectly entering user credentials.
Figure 2F:
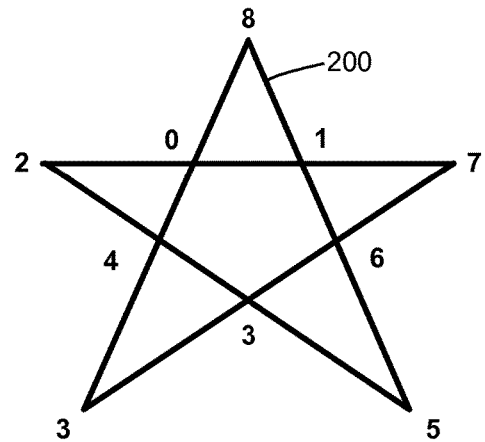

FIG. 2E depicts one embodiment of a star grid 200 in which a plurality of numbers have been randomly or pseudo-randomly assigned to line intersection points of the star grid 200. In one embodiment, during an authentication procedure, the star grid 200 and the corresponding plurality of numbers may be displayed to an end user of a touch-sensitive interface (e.g., a touchscreen interface for a mobile device). FIG. 2F depicts another embodiment of a star grid 200 in which a plurality of numbers have been randomly or pseudo-randomly assigned to line intersection points of the star grid 200. In some cases, each time an authentication procedure is performed, the plurality of numbers may be reassigned or the positions of the plurality of numbers may be rearranged. For example, during a first login procedure for accessing an application, the star grid 200 and the plurality of numbers depicted in FIG. 2E may be displayed to the end user. During a second login procedure subsequent to the first login procedure, the star grid 200 and the plurality of numbers depicted in FIG. 2F may be displayed to the end user.

Figure 2G:
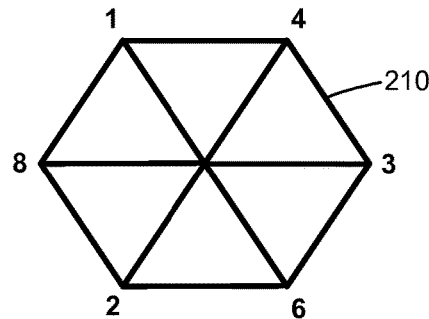
Figure 2H:
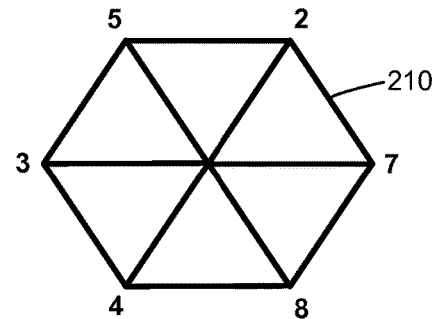

FIG. 2G depicts one embodiment of a hexagonal grid 210 in which a plurality of numbers have been randomly or pseudo-randomly assigned to line intersection points of the hexagonal grid 210. In one embodiment, during an authentication procedure, the hexagonal grid 210 and the corresponding plurality of numbers may be displayed to an end user of a touch-sensitive interface (e.g., a touchscreen interface for a mobile device). FIG. 2H depicts another embodiment of a hexagonal grid 210 in which a plurality of numbers have been randomly or pseudo-randomly assigned to line intersection points of the hexagonal grid 210. In some cases, each time an authentication procedure is performed, the plurality of numbers may be reassigned. For example, during a first login procedure for accessing an application, the hexagonal grid 210 and the plurality of numbers depicted in FIG. 2G may be displayed to the end user. During a second login procedure subsequent to the first login procedure, a hexagonal 210 and the plurality of numbers depicted in FIG. 2H may be displayed to the end user.

Figure 2I:
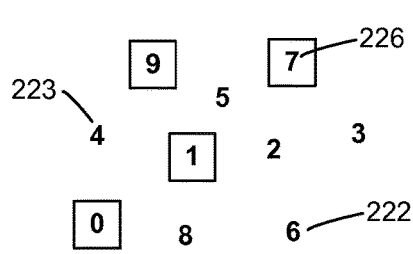

FIG. 2I depicts one embodiment of a first set of numbers including a starting number 222 and an ending number 223 and a second set of numbers including a second number 226 that may be displayed to an end user of a touch-sensitive interface. The first set of numbers may be distinguished from the second set of numbers as the second set of numbers may be enclosed within a shape, such as a square. In some cases, the first set of numbers may be distinguished from the second set of numbers by displaying the first set of numbers using a first color and displaying the second set of numbers using a second color different from the first color. In one embodiment, an end user may perform a swiping gesture from the starting number 222 to the ending number 223. In this case, the starting number 222 and the ending number 223 may comprise a pair of numbers. The pair of numbers may be used to generate a portion of a PIN code or password, or other user credential that is different from the starting number 222 and/or the ending number 223.

Figure 2J:
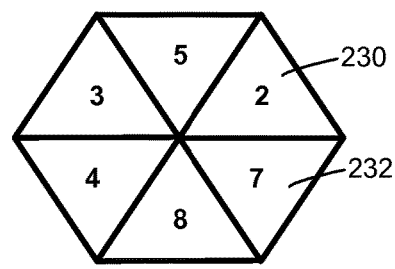

FIG. 2J depicts one embodiment of a set of number regions in which a plurality of numbers has been arranged within the set of number regions. In one embodiment, during an authentication procedure, an end user of a touch-sensitive interface may perform a swiping gesture from a first number region 230 (in this case, corresponding with the number 2) to a second number region 232 (in this case, corresponding with the number 7) in order to indirectly enter a portion of a user credential. In one example, a first number associated with the first number region 230 may be added to a second number associated with the second number region 232 in order to generate the portion of the user credential. In this case, the portion of the user credential may comprise the number 9. In another example, a first number associated with the first number region 230 may be multiplied by a second number associated with the second number region 232 in order to generate the portion of the user credential. In this case, the portion of the user credential may comprise the number 14.

Figure 3A:
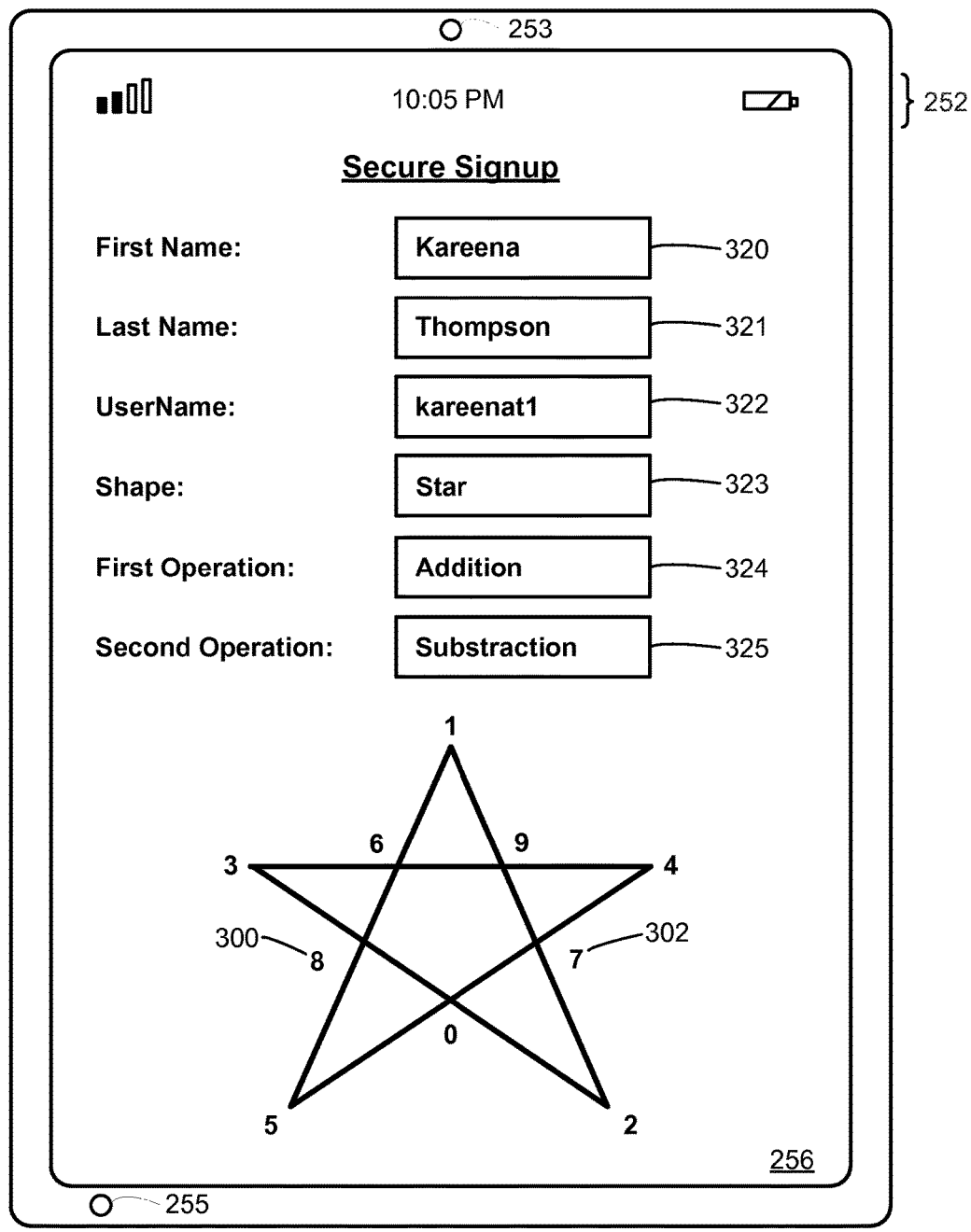
FIG. 3A depicts one embodiment of a mobile device in which an end user of the mobile device has initiated a registration phase for establishing user credentials for accessing a resource.

FIG. 3A depicts one embodiment of the mobile device 140 of FIG. 1 in which an end user of the mobile device has initiated a registration phase for establishing user credentials for accessing a resource (e.g., an application or a webpage). As depicted, mobile device 140 includes a touchscreen display 256, a microphone 255, and a front-facing camera 253. The mobile device 141 may also include a rear-facing camera (e.g., located on the backside of the mobile device).

The touchscreen display 256 may include an LCD display for presenting a user interface to an end user of the mobile device. The touchscreen display 256 may include a status area 252 which provides information regarding signal strength, time, and battery life associated with the mobile device. The microphone 255 may capture audio associated with the end user (e.g., the end user's voice) for determining the identity of the end user. The front-facing camera 253 may be used to capture images of the end user for determining the identity of the end user. The mobile device may include a web browser for loading and viewing webpages.

As depicted in FIG. 3A, the end user has entered a first name in a first name field 320, a last name in a last name field 321, and a username in a username field 322. The end user has also selected a shape associated with various paths for interconnecting a plurality of numbers using a pull-down menu 323, a first arithmetic operation using a pull-down menu 324, and a second arithmetic operation using a pull-down menu 325.

In some embodiments, an end user of the mobile device 140 may perform a plurality of swiping gestures in order to enter a PIN code or password to be used for accessing a protected application (e.g., an online banking application). In one example, the end user may perform a first swiping gesture of the plurality of swiping gestures in order to enter a first digit of the PIN code or password. The end user may subsequently perform a second swiping gesture of the plurality of swiping gestures in order to enter a second digit of the PIN code or password. In one example, the second swiping gesture may select a starting number 300 and an ending number 302. The mobile device 140 may then generate the second digit by subtracting the ending number 302 from the starting number 300.

In one embodiment, the first arithmetic operation may correspond with the arithmetic operation to be performed if a starting number is less than an ending number identified during a swiping gesture. The second arithmetic operation may correspond with the arithmetic operation to be performed if a starting number is greater than or equal to an ending number identified during the swiping gesture. In another embodiment, the first arithmetic operation may correspond with the arithmetic operation to be performed if a swiping gesture is performed at a speed that is greater than a threshold speed and the second arithmetic operation may correspond with the arithmetic operation to be performed if the swiping gesture is performed at a speed that is less than the threshold speed.

Figure 3B:
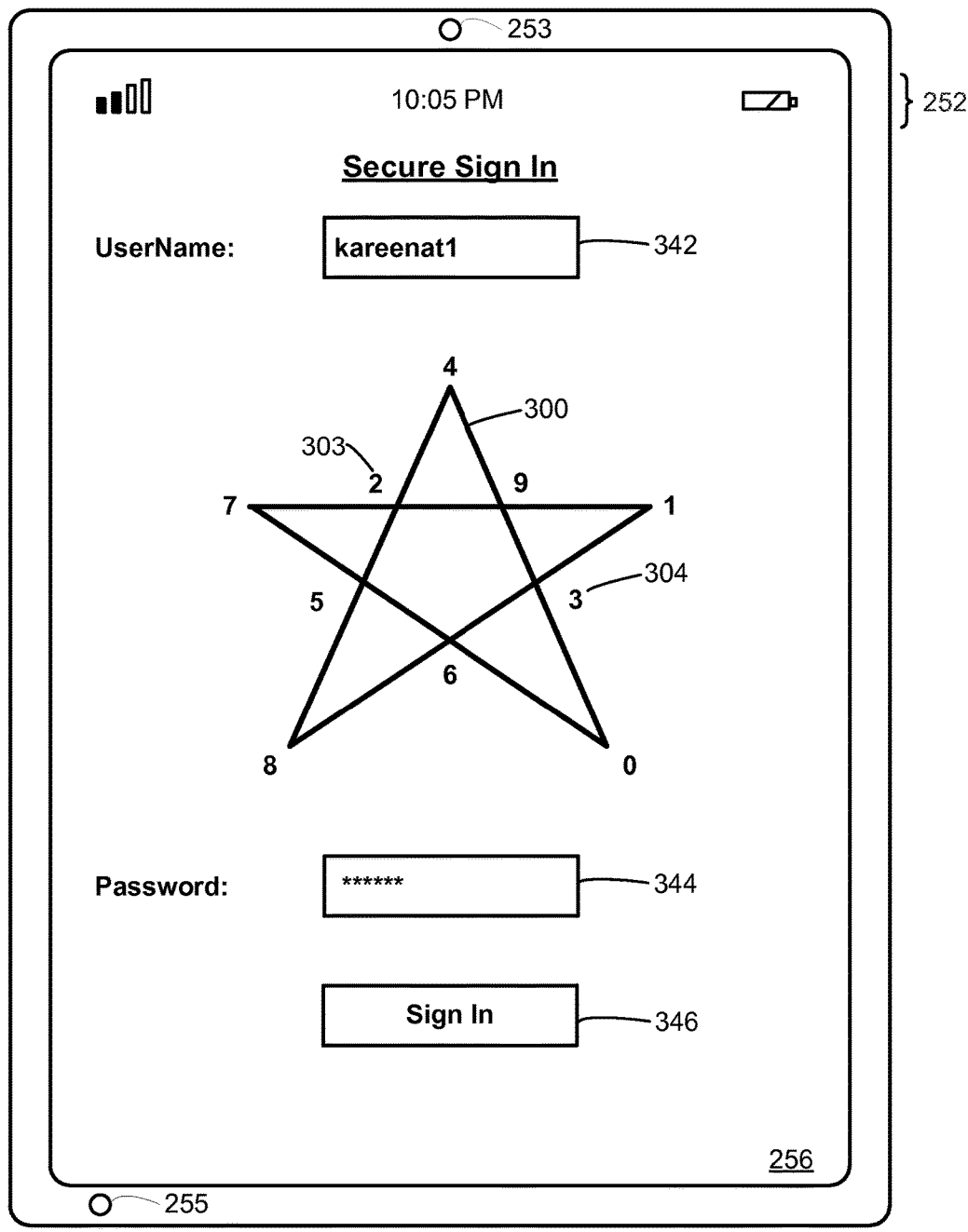
FIG. 3B depicts one embodiment of a mobile device in which an end user of the mobile device has initiated an authentication phase for determining whether access to a resource should be granted.

FIG. 3B depicts one embodiment of the mobile device 140 of FIG. 1 in which an end user of the mobile device has initiated an authentication phase for determining whether access to a resource (e.g., an application, a database, a file, a webpage, a computer program, a file system, a server, or a storage device) should be granted. As depicted, the end user of the mobile device has entered a username in the username field 342, which has in turn caused a star grid 300 to be displayed. The star grid 300 may have been specified by the end user during a registration phase for establishing user credentials for accessing the resource. Different usernames may correspond with different interconnecting paths that are displayed for connecting a plurality of numbers.

As depicted, although the same star grid 300 is displayed, the assignment of the plurality of numbers depicted in FIG. 3B is different from the plurality of numbers depicted in FIG. 3A. The end user may indirectly enter a password using the star grid 300 and the plurality of numbers depicted in FIG. 3B. For example, the end user may perform a first swiping gesture to select a starting number 304 and an ending number 303 in order generate a first digit of the password using the starting number 304 and the ending number 303. The end user may perform a second swiping gesture to select a pair of numbers for generating a second digit of the password using the pair of numbers. The generated digits may be hidden using asterisks so that others may not view the actual digits generated. Once the password has been generated by the mobile device and the password field 344 has been automatically filled in by the mobile device with the password, the end user may submit the password by selecting the virtual Sign In button 346. In some cases, the mobile device may determine whether to grant access to the resource based on the submitted password. In other cases, the mobile device may transmit the password to an authentication server, which may determine whether to grant access to the resource based on the submitted password.

Figure 4A:
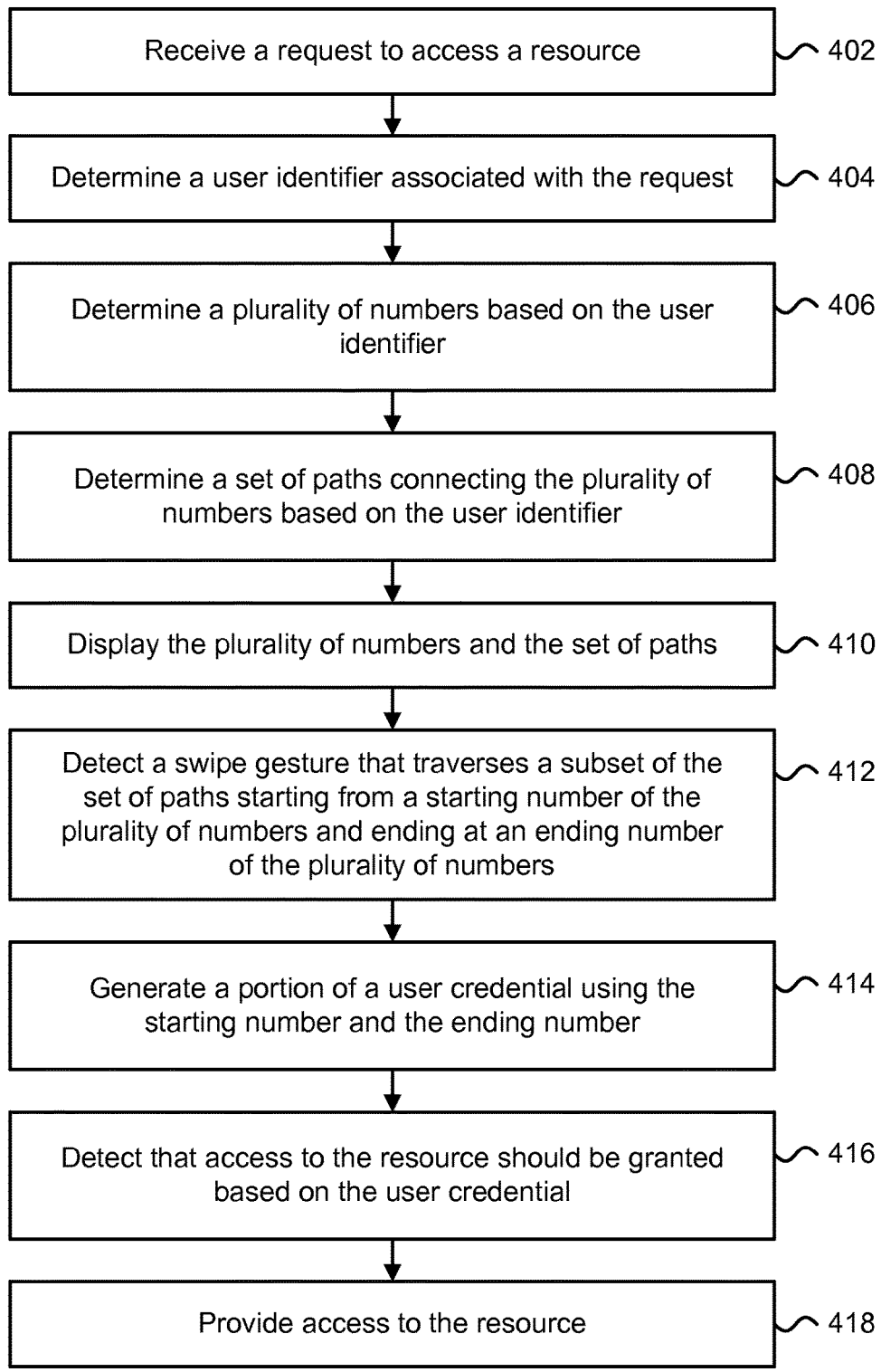
FIG. 4A is a flowchart describing one embodiment of a process for authenticating user credentials using a computing device.

FIG. 4A is a flowchart describing one embodiment of a process for authenticating user credentials using a computing device. In one embodiment, the process of FIG. 4A may be performed by a mobile device, such as mobile device 140 in FIG. 1.

In step 402, a request to access a resource is received. The resource may comprise an application, an online application, a computer program, a webpage, a database, or a set of files. In step 404, a user identifier associated with the request is determined. In one embodiment, the user identifier may correspond with a userid or a username provided by an end user requesting access to the resource. In step 406, a plurality of numbers is determined based on the user identifier. In one example, the user identifier may correspond with a set of 10 numbers (e.g., ranging from 0 to 9). In another example, the user identifier may correspond with a set of 40 numbers (e.g., ranging from 1 to 40). A larger set of numbers may be used in order to provide improved security and the size of the set of numbers may be selected by the end user during a registration phase.

In step 408, a set of paths connecting the plurality of numbers is determined based on the user identifier. In one example, the set of paths may correspond with a star grid, such as the star grid 300 depicted in FIG. 3B. In another example, the set of paths may correspond with a hexagonal grid, such as the hexagonal grid 210 depicted in FIG. 2G. In step 410, the plurality of numbers and the set of paths are displayed. The plurality of numbers and the set of paths may be displayed using a touchscreen interface. In step 412, a swipe gesture that traverses at least a subset of the set of paths starting from a starting number of the plurality of numbers and ending at an ending number of the plurality of numbers is detected. In step 414, a portion of a user credential is generated using the starting number and the ending number. In one example, the portion of the user credential may be generated by combining or summing the starting number and the ending number. In another example, the portion of the user credential may be generated by determining a difference between the starting number and the ending number. The determination of whether to add or subtract the starting number and the ending number may depend on the numerical values of the starting number and the ending number. In step 416, it is detected that access to the resource should be granted based on the user credential. The user credential may comprise a PIN code or a password. In step 418, access to the resource is provided in response to detecting that access to the resource should be granted.

Figure 4B:
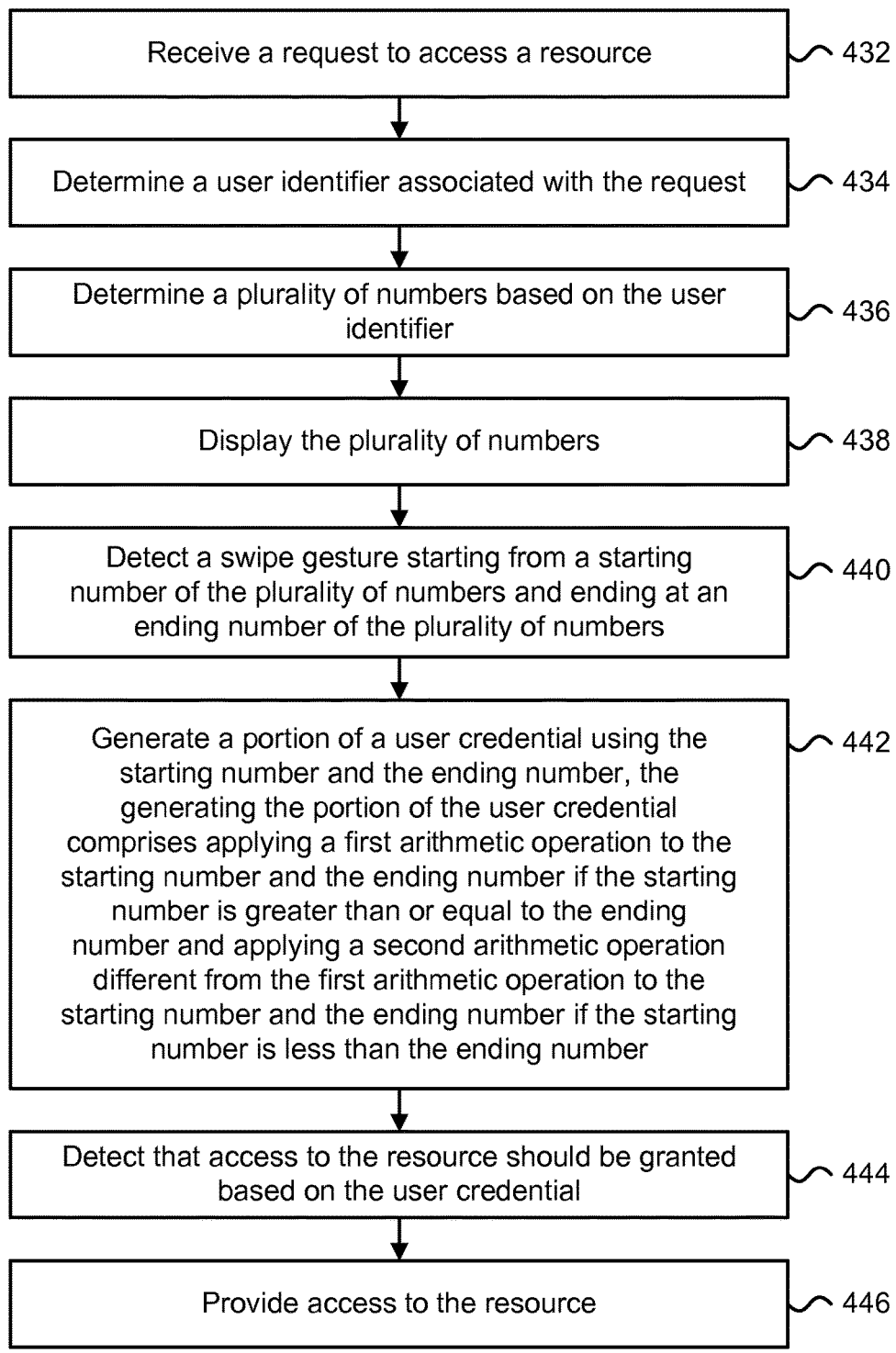
FIG. 4B is a flowchart describing an alternative embodiment of a process for authenticating user credentials using a computing device.

FIG. 4B is a flowchart describing an alternative embodiment of a process for authenticating user credentials using a computing device. In one embodiment, the process of FIG. 4B may be performed by a mobile device, such as mobile device 140 in FIG. 1.

In step 432, a request to access a resource is received. The resource may comprise an application, an online application, a computer program, a webpage, a database, or a set of files. In step 434, a user identifier associated with the request is determined. In one embodiment, the user identifier may correspond with a userid or a username provided by an end user requesting access to the resource. In step 436, a plurality of numbers is determined based on the user identifier. In one example, the user identifier may correspond with a set of 10 numbers (e.g., ranging from 0 to 9). In step 438, the plurality of numbers is displayed. The plurality of numbers may be displayed using a touchscreen interface (e.g., a touchscreen interface associated with a kiosk, an ATM machine, or a smart phone).

In step 440, a swipe gesture that starts from a starting number of the plurality of numbers and ends at an ending number of the plurality of numbers is detected. The swipe gesture may correspond with the end user first touching a surface of the touchscreen interface at a first location corresponding with the starting number and removing their finger from the touchscreen interface at a second location corresponding with the ending number. In step 442, at least a portion of a user credential is generated using the starting number and the ending number. In one embodiment, the user credential may be generated by applying a first arithmetic operation to the starting number and the ending number if the starting number is greater than or equal to the ending number and applying a second arithmetic operation different from the first arithmetic operation to the starting number and the ending number if the starting number is less than the ending number. In one example, the first arithmetic operation may comprise a subtraction operation and the second arithmetic operation may comprise an addition operation. In step 444, it is detected that access to the resource should be granted based on the user credential. The user credential may comprise a PIN code or a password. In step 446, access to the resource is provided in response to detecting that access to the resource should be granted.

One embodiment of the disclosed technology includes acquiring a user identifier associated with an end user of a computing device, the user identifier corresponds with registered user credentials for accessing a protected resource. The method further comprises determining a plurality of numbers based on the user identifier, displaying the plurality of numbers using a display of the computing device, detecting a swipe gesture performed by the end user of the computing device that starts from a starting number of the plurality of numbers and ends at an ending number of the plurality of numbers, and generating a portion of a user credential using the starting number and the ending number. The generating the portion of the user credential comprises applying a first arithmetic operation to the starting number and the ending number if the starting number is greater than or equal to the ending number and applying a second arithmetic operation different from the first arithmetic operation to the starting number and the ending number if the starting number is less than the ending number. The method further comprises granting access to the protected resource if the user credential matches the registered user credentials for accessing the protected resource.

One embodiment of the disclosed technology includes a display in communication with a set of processors. The set of processors acquires a user identifier associated with an end user of a computing device. The user identifier corresponds with registered user credentials for accessing a protected resource. The set of processors determines a plurality of numbers based on the user identifier and causes the plurality of numbers to be displayed using the display. The set of processors detects a swipe gesture performed by the end user of the computing device that starts from a starting number of the plurality of numbers and ends at an ending number of the plurality of numbers. The set of processors generates a portion of a user credential using the starting number and the ending number. The set of processors applies a first arithmetic operation to the starting number and the ending number if the starting number is greater than or equal to the ending number and applies a second arithmetic operation different from the first arithmetic operation to the starting number and ending number if the starting number is less than the ending number. The set of processors grants access to the protected resource if the user credential matches the registered user credentials for accessing the protected resource.

One embodiment of the disclosed technology includes a computer readable storage medium having computer readable program code embodied therewith, the computer readable program code comprising computer readable program code configured to acquire a user identifier associated with an end user of a computing device, the user identifier corresponds with registered user credentials for accessing a protected resource. The computer readable program code comprising computer readable program code configured to determine a plurality of numbers based on the user identifier, display the plurality of numbers using a display of the computing device, detect a swipe gesture performed by the end user of the computing device that starts from a starting number of the plurality of numbers and ends at an ending number of the plurality of numbers, and generate a portion of a user credential using the starting number and the ending number. The portion of the user credential is generated by applying a first arithmetic operation to the starting number and the ending number if the starting number is greater than or equal to the ending number and applying a second arithmetic operation different from the first arithmetic operation to the starting number and ending number if the starting number is less than the ending number. The first arithmetic operation comprises a subtraction operation. The second arithmetic operation comprises an addition operation. The portion of the user credential is different from the starting number and the ending number. The computer readable program code comprising computer readable program code configured to grant access to the protected resource if the user credential matches the registered user credentials for accessing the protected resource.

Figure 5:
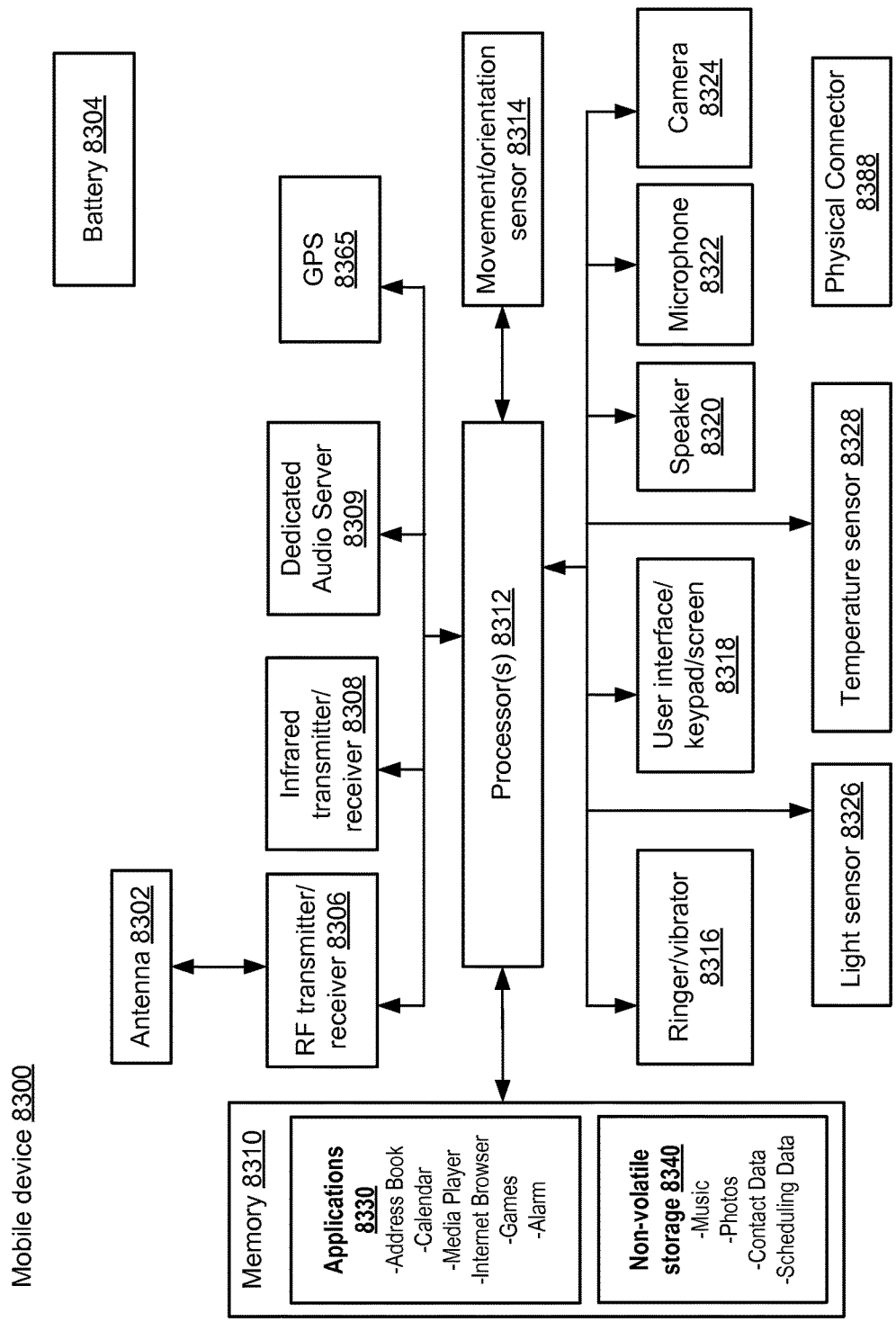
FIG. 5 depicts one embodiment of a mobile device.

The disclosed technology may be used with various computing systems. FIG. 5 depicts one embodiment of a mobile device 8300, which includes one example of an implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, reference in the specification to "an embodiment," "one embodiment," "some embodiments," or "another embodiment" may be used to described different embodiments and do not necessarily refer to the same embodiment.

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enabling secure user authentication, comprising:
   acquiring a user identifier associated with an end user of a computing device, the user identifier corresponds with registered user credentials for accessing a protected resource;
   determining a plurality of numbers based on the user identifier;
   displaying the plurality of numbers using a display of the computing device;
   determining a set of paths connecting at least a subset of the plurality of numbers based on the user identifier;

displaying the set of paths using the display of the computing device;

detecting a swipe gesture performed by the end user of the computing device that starts from a starting number of the plurality of numbers and ends at an ending number of the plurality of numbers;

wherein the swipe gesture performed by the end user of the computing device traverses at least a subset of the set of paths starting from the starting number of the plurality of numbers and ending at the ending number of the plurality of numbers;

generating a portion of a user credential using the starting number and the ending number, the generating the portion of the user credential comprises applying a first arithmetic operation to the starting number and the ending number if the starting number is greater than or equal to the ending number and applying a second arithmetic operation different from the first arithmetic operation to the starting number and the ending number if the starting number is less than the ending number; and granting access to the protected resource if the user credential matches the registered user credentials for accessing the protected resource.

2. The method of claim 1, wherein:
the set of paths corresponds with a star-shaped grid.

3. The method of claim 1, wherein:
the first arithmetic operation comprises a subtraction operation; and
the second arithmetic operation comprises an addition operation.

4. The method of claim 1, wherein:
the computing device comprises a mobile device; and
the display of the computing device comprises a touch-sensitive display.

5. The method of claim 4, wherein:
the swipe gesture performed by the end user of the computing device comprises the end user first touching the touch-sensitive display at a first location corresponding the starting number with their finger, moving their finger along a surface of the touch-sensitive display, and then removing their finger from the touch-sensitive display at a second location corresponding the ending number.

6. The method of claim 1, wherein:
the user credential comprises a password; and
the protected resource comprises one of an application, a database, a file, a webpage, a computer program, a server, or a storage device.

7. The method of claim 1, wherein:
the generating a portion of a user credential comprises generating the user credential such that the user credential is different from the starting number and the ending number.

8. The method of claim 1, wherein:
the user credential comprises a personal identification number; and
the generating a portion of a user credential comprises generating a first digit of the personal identification number by subtracting the ending number from the starting number.

9. The method of claim 1, further comprising:
determining a speed of the swipe gesture; and
determining the first arithmetic operation based on the speed of the swipe gesture.

10. A system, comprising:
a display; and
a set of processors in communication with the display, the set of processors acquires a user identifier associated with an end user of a computing device, the user identifier corresponds with registered user credentials for accessing a protected resource, the set of processors determines a plurality of numbers based on the user identifier and causes the plurality of numbers to be displayed using the display, the set of processors detects a swipe gesture performed by the end user of the computing device that starts from a starting number of the plurality of numbers and ends at an ending number of the plurality of numbers, the set of processors generates a portion of a user credential using the starting number and the ending number, the set of processors applies a first arithmetic operation to the starting number and the ending number if the starting number is greater than or equal to the ending number and applies a second arithmetic operation different from the first arithmetic operation to the starting number and ending number if the starting number is less than the ending number, the set of processors grants access to the protected resource if the user credential matches the registered user credentials for accessing the protected resource, wherein the set of processors determines a set of paths connecting at least a subset of the plurality of numbers based on the user identifier and causes the set of paths to be displayed using the display, the swipe gesture performed by the end user of the computing device traverses at least a subset of the set of paths starting from the starting number of the plurality of numbers and ending at the ending number of the plurality of numbers.

11. The system of claim 10, wherein:
the set of paths corresponds with a star-shaped grid.

12. The system of claim 10, wherein:
the first arithmetic operation comprises a subtraction operation; and
the second arithmetic operation comprises an addition operation.

13. The system of claim 10, wherein:
the display comprises a touch-sensitive display.

14. The system of claim 10, wherein:
the swipe gesture performed by the end user comprises the end user first selecting the starting number of the plurality of numbers by touching the touch-sensitive display at a first location corresponding the starting number with their finger and then removing their finger from the touch-sensitive display at a second location corresponding the ending number.

15. The system of claim 10, wherein:
the user credential comprises a password; and
the protected resource comprises one of an application, a database, a file, a webpage, a computer program, a server, or a storage device.

16. The system of claim 10, wherein:
the portion of the user credential is different from the starting number and the ending number.

17. The system of claim 10, wherein:
the user credential comprises a personal identification number; and
the generating a portion of a user credential comprises generating a first digit of the personal identification number by subtracting the ending number from the starting number.

18. A computer program product, comprising:

a non-transitory computer readable storage medium having computer readable program code embodied therewith, the computer readable program code comprising:

computer readable program code configured to acquire a user identifier associated with an end user of a computing device, the user identifier corresponds with registered user credentials for accessing a protected resource;

computer readable program code configured to determine a plurality of numbers based on the user identifier;

computer readable program code configured to display the plurality of numbers using a display of the computing device;

computer readable program code configured to determine a set of paths connecting at least a subset of the plurality of numbers based on the user identifier;

computer readable program code configured to display the set of paths using the display of the computing device;

computer readable program code configured to detect a swipe gesture performed by the end user of the computing device that starts from a starting number of the plurality of numbers and ends at an ending number of the plurality of numbers;

wherein the swipe gesture performed by the end user of the computing device traverses at least a subset of the set of paths starting from the starting number of the plurality of numbers and ending at the ending number of the plurality of numbers;

computer readable program code configured to generate a portion of a user credential using the starting number and the ending number, the portion of the user credential is generated by applying a first arithmetic operation to the starting number and the ending number if the starting number is greater than or equal to the ending number and applying a second arithmetic operation different from the first arithmetic operation to the starting number and ending number if the starting number is less than the ending number, the first arithmetic operation comprises a subtraction operation, the second arithmetic operation comprises an addition operation, the portion of the user credential is different from the starting number and the ending number; and computer readable program code configured to grant access to the protected resource if the user credential matches the registered user credentials for accessing the protected resource.

\* \* \* \* \*